United States Patent
Schafer et al.

(10) Patent No.: US 10,025,575 B2
(45) Date of Patent: Jul. 17, 2018

(54) METHOD FOR INSTALLING SECURITY-RELEVANT APPLICATIONS IN A SECURITY ELEMENT OF A TERMINAL

(71) Applicant: GIESECKE & DEVRIENT GMBH, Munich (DE)

(72) Inventors: Frank Schafer, Puchheim (DE); Daniel Albert, Munich (DE); Claus Dietze, Obersochering (DE); Johannes Luyken, Munich (DE); Ralf Schedel, Starnberg (DE); Helmut Schuster, Irsee (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 345 days.

(21) Appl. No.: 14/421,336

(22) PCT Filed: Aug. 12, 2013

(86) PCT No.: PCT/EP2013/002419
§ 371 (c)(1),
(2) Date: Feb. 12, 2015

(87) PCT Pub. No.: WO2014/026760
PCT Pub. Date: Feb. 20, 2014

(65) Prior Publication Data
US 2015/0234646 A1    Aug. 20, 2015

(30) Foreign Application Priority Data
Aug. 14, 2012  (DE) .................. 10 2012 016 164

(51) Int. Cl.
*G06F 8/61* (2018.01)
*G06F 9/445* (2018.01)
*G06F 21/57* (2013.01)

(52) U.S. Cl.
CPC ............. *G06F 8/61* (2013.01); *G06F 9/445* (2013.01); *G06F 21/572* (2013.01); *G06F 2221/03* (2013.01)

(58) Field of Classification Search
None
See application file for complete search history.

(56) References Cited

U.S. PATENT DOCUMENTS 6,763,465 B1 *  7/2004  Kelley .................... G06F 21/78
                                                 380/257
7,120,909 B1 * 10/2006  Shibuya .................. G06F 8/60
                                                 455/419

(Continued)

FOREIGN PATENT DOCUMENTS

DE    102006024041 A1    1/2008
DE    102009004113 A1    7/2010
EP        1076279 A1    2/2001

OTHER PUBLICATIONS

German Search Report for corresponding German Application No. 102012016164.6, dated Jun. 20, 2013.

(Continued)

*Primary Examiner* — Chat Do
*Assistant Examiner* — Douglas Slachta
(74) *Attorney, Agent, or Firm* — Workman Nydegger (57) ABSTRACT

A method is provided for installing a security-relevant portion of an application made available by an application provider in a security element of a terminal. The terminal requests the application from the application provider and receives the application. Subsequently, the received security-relevant portion of the application is transmitted to a trustworthy instance administrating the security element. The trustworthy instance subsequently installs the security-relevant portion of the application in the security element.

14 Claims, 2 Drawing Sheets

(56) References Cited

U.S. PATENT DOCUMENTS

| | | | | |
|---|---|---|---|---|
| 7,831,838 B2* | 11/2010 | Marr | G06F 21/52 | 713/187 |
| 8,171,525 B1* | 5/2012 | Pelly | H04L 9/083 | 380/277 |
| 8,335,921 B2* | 12/2012 | von Behren | G06Q 20/3552 | 380/278 |
| 8,417,643 B2* | 4/2013 | Mardikar | G06Q 20/1085 | 235/379 |
| 8,807,440 B1* | 8/2014 | von Behren | G06Q 20/367 | 235/492 |
| 2003/0115479 A1* | 6/2003 | Edwards | G06F 21/564 | 726/22 |
| 2004/0015960 A1* | 1/2004 | Wanchoo | G06F 9/445 | 717/178 |
| 2005/0132227 A1 | 6/2005 | Reasor et al. | | |
| 2007/0234343 A1 | 10/2007 | Gouge et al. | | |
| 2008/0244167 A1* | 10/2008 | Tolmie | G06F 21/57 | 711/104 |
| 2010/0205432 A1* | 8/2010 | Corda | G06F 21/335 | 713/159 |
| 2010/0211772 A1 | 8/2010 | Johansson et al. | | |
| 2010/0291904 A1* | 11/2010 | Musfeldt | G06F 21/604 | 455/414.1 |
| 2010/0306076 A1* | 12/2010 | Taveau | G06Q 20/02 | 705/26.8 |
| 2011/0072425 A1* | 3/2011 | Lemonnier | G06Q 20/3552 | 717/178 |
| 2011/0078081 A1* | 3/2011 | Pirzadeh | G06Q 20/20 | 705/44 |
| 2011/0087610 A1* | 4/2011 | Batada | G06F 21/72 | 705/318 |
| 2011/0113473 A1 | 5/2011 | Corda et al. | | |
| 2011/0131421 A1* | 6/2011 | Jogand-Coulomb | G06F 8/61 | 713/189 |
| 2011/0299121 A1* | 12/2011 | Kaku | H04N 1/4413 | 358/1.15 |
| 2012/0129452 A1* | 5/2012 | Koh | G06Q 20/352 | 455/41.1 |
| 2012/0159148 A1* | 6/2012 | Behren | G06Q 20/3552 | 713/150 |
| 2012/0172089 A1* | 7/2012 | Bae | H04L 63/067 | 455/558 |
| 2013/0111207 A1* | 5/2013 | von Behren | G06Q 20/3552 | 713/164 |

OTHER PUBLICATIONS

International Search Report for corresponding International PCT Application No. PCT/EP2013/002419, dated Nov. 5, 2013.

* cited by examiner

METHOD FOR INSTALLING SECURITY-RELEVANT APPLICATIONS IN A SECURITY ELEMENT OF A TERMINAL

BACKGROUND

The present invention relates to a method for installing a security-relevant portion of an application in a security element of a portable terminal, a corresponding security element, as well as a portable terminal having such a security element.

The functionality of portable terminals, such as for example of mobile communication terminals, smart phones, tablets and the like, can be extended in known fashion by installing software functionalities, so-called applications or "apps". Various ones of these applications therein serve for uses where also security-relevant data are comprised and/or processed. Security-relevant data can be for example personal data of a user of the terminal which are to be kept secret, such as for example biometric data, or data employed for making financial transactions, such as for example credit card number, account data, content of electronic purses, cryptographic keys, etc. In the context of the present in invention, a security-relevant portion of an application is understood as both security-relevant data comprised in and processed by the application and (partial) functionalities of the application which serve for processing these data.

It is known to protect such security-relevant portions of an application against manipulation and unauthorized access by storing or installing these parts in the terminal in a specially secured area.

Security elements that can be integrated in a terminal or are permanently incorporated therein represent suitable secured areas. Security elements which can be removably integrated are for example SIM/UICC mobile communication cards, secure multimedia cards or the like. For example embedded SIM/UICC mobile communication cards, TPMs (trusted platform modules) or NFC modules can serve as security elements which are permanently incorporated in the terminal. Finally, also secure execution environments within a specific hardware architecture of the terminal, for example within an ARM TrustZone architecture, can serve as security elements, such as for example a "trusted execution environment" according to the "Global Platform" specification.

An installation of data and/or applications or portions of applications in such a security element is cryptographically secured as a rule. Increasingly, security-relevant portions of applications installed on portable terminals are carried out with the aid of trustworthy instances, so-called "trusted service managers" (hereinafter referred to as TSM). These take the security-relevant portions as service providers, and carry out the installation process, i.e. the secured installation of the portions in the security element. In the following the formulation will be used in this context according to which the TSM "administrates" the security element. Prior to the step of installation, cryptographic keys are exchanged between the TSM and the institution making available the application, for example a bank in the case of a payment application to be personalized, and are introduced in the security element in secured fashion. By means of these keys the installation process can be secured cryptographically.

It must be noted that a security element of the above-described type can comprise a plurality of secured areas. This means that for example a SIM card as a physical security element can comprise a plurality of secured areas in one memory of the card. In particular, these secured areas can be present in the form of so-called "security domains" according to the Global Platform specification (cf. e.g. Global Platform, Card Specification, version 2.2). Such a "security domain" as a rule is allocated to a predetermined external instance, for example the issuer of the data carrier, a network operator, an application provider or the like. This instance will be referred to as "owner" of the "security domain" in the following. In analogous fashion, in the following reference will be made to an "owner" of a security element when the respective instance is to be indicated to which the security element is allocated. The owner of the security element is responsible in particular for the key architecture of the security element.

A "security domain" represents a privileged application, which has its own cryptographic key architecture. This makes it possible in particular to install data and application in a secure fashion in the area of a memory of the respective data carrier or security module that is administrated by the "security domain". "Security domains" can be present on a security element in hierarchically arranged fashion. In particular, different "security domains" can be administrated by different TSMs on a physical security element, for example a SIM card, in the above-described fashion for installing security-relevant portions of an application.

It is a disadvantage of the described procedure for installing security-relevant portions of an application in a security element that a developer who programs applications and offers these for downloading to a portable terminal via an application provider, for example via a so-called "app store", can practically not offer applications with security-relevant portions when this approach is taken. The free development of applications with security-relevant portions is substantially limited and impeded thereby.

This is applicable for the reason that an installation of security-relevant portions in a security element of the terminal has been possible so far only in cooperation with the respective TSM of the security element. However, this TSM is usually unknown to the developer, in particular since a multiplicity of TSMs exist today. Further, different users of terminals can provide respectively different TSMs for administrating the corresponding security elements for the purpose of administrating respectively one security element that is fundamentally provided for installing the same application and/or its security-relevant portion. Finally, a developer of an application does not have access and cannot influence the key architecture of a security element of a terminal of any user wishing to acquire and install the application via an "app store", i.e. without direct interaction with the developer. This means that even if the developer knew and could contact the responsible TSM in the concrete case, no installation of data could take place on the security element. The developer could exchange corresponding cryptographic keys with the TSM, but it would not be possible for the developer to incorporate these keys in the security element, since he has no access to such a security element.

SUMMARY

It is the object of the present invention to make it possible to install in a simple and secure fashion an application that has a security-relevant portion and is made available by any desired application provider on a portable terminal with a security element integrated therein.

This object is achieved by a method, a security element, as well as a portable terminal with a security element having the features of the independent claims.

The present invention is based on the idea that the security-relevant portion of the application is not transferred by the developer to the TSM and is then installed in the security element, but is sent to the terminal together with the remaining, not security-relevant portions of the application to be installed in the terminal. The transmission of the sent security-relevant portion of the application to the responsible TSM takes place from the terminal. The TSM installs the forwarded, security-relevant part of the application in the security element. The transmission to the TSM can be carried out by the terminal or by the security element itself. A determination (selection) of the responsible TSM takes place with the aid of information (selection data) stored on the security element and/or the terminal.

In this fashion, it is possible for the developer on the one hand to offer the complete application—independently of the security element and its owner and independently of the responsible TSM administrating the security element where the security-relevant portion is to be installed. A coordination between the manufacturer of the security-relevant portion of the application, namely the developer, with the TSM, which had been required so far, can be omitted, in particular in view of the cryptographic keys required for installation in the security element. These are already present both in the security element and at the TSM, due to the already existing relationship between the owner of the security element and the TSM administrating the security element. In this way, it is now possible to install the security-relevant portion of the application in interaction between the security element and the TSM—independently of the developer and the application provider.

Concretely, a method according to the invention for installing a security-relevant portion of an application made available by a developer via an application provider in a security element of a portable terminal comprises the following steps: The terminal requests the application from the application provider and subsequently receives the application from the application provider, as a result of the request. The application can be downloaded by means of the terminal for example from an Internet portal of the application provider. As a rule, the terminal receives the application already in a form in which the security-relevant portion and not security-relevant portions are present separately. Otherwise, the terminal or the security element of the terminal can be adapted to determine the security-relevant portion of the application and to separate it from the remaining portions, if required.

In a further step the security-relevant portion of the application is transmitted to a trustworthy instance, for example a TSM, administrating the security element. This step can be carried out by the security module and/or the terminal. Such a transmission can take place for example via the Internet or via a mobile communication network, e.g. by SMS. The security element integrated in the terminal can employ data communication interfaces of the terminal for transmitting these data, for example by means of a SIM toolkit.

Finally, the trustworthy instance installs the security-relevant portion of the application in the security element. The trustworthy instance can suitably prepare the security-relevant portion of the application before installation in the security element, for example in view of an installation format, in view of different security requirements or the like.

A security element according to the invention for a portable terminal, when integrated in the portable terminal, is consequently adapted to transmit a security-relevant portion of an application received by the terminal to a trustworthy instance administrating the security element.

A portable terminal according to the invention finally comprises a security element according to the invention, which is removably integrated or permanently incorporated, and is adapted to support a method according to the invention in the described fashion.

Employing such a terminal and by means of the method according to the invention, an installation of an application made available by any desired developer via an application provider can take place in a simple and secure fashion, wherein a security-relevant portion of the application is installed on the security element of the terminal.

Preferably the security-relevant portion of the application is checked before its installation in the security element. Such a check is expedient and increases the security of the method particularly when the security-relevant portion comprises executable or interpretable code that is to be executed in the security element. However, also non-executable data, for example personalization data, can be checked.

A check can concern respectively different aspects. In connection with executable code, it can be checked for example whether the security-relevant portion is compatible with the security element, for example with a processor and/or an interpreter of the security element, an operating system of the security element and the like. Also compliance with technical specifications can form part of the check, for example whether employed commands fulfill a given specification. Further, the security-relevant portion can be checked in view of the functionality made available by this portion, in particular also with respect to whether the security-relevant portion comprises malicious code. Other security aspects, for example the susceptibility of the security-relevant portion to known attacks on security elements, for example so-called side channel attacks, can be checked alternatively or additionally.

In connection with executable or non-executable code, a check can take place for example in view of integrity and/or authenticity of the data in question. For this purpose known methods can be employed, for example checksums, so-called "message authentication codes" or certificates, for example on the basis of an asymmetrical key architecture.

Such a check can be carried out by different bodies. On the one hand, the trustworthy instance can check the security-relevant portion. Such a check takes place before installing the portion in the security element. An installation takes place only if the check has been successful, i.e. if the security-relevant portion of the application fulfills predetermined requirements checked within the framework of the check.

However, the check can also be carried out by an external check instance, for example a software certifying body, the issuer of the security element, the application provider or similar instances. For this purpose, the developer can present the security-relevant portion of the application to the check instance or certifying body before making the application available for download via the application provider. The portion is checked by the former and supplied with a corresponding certificate after the successful check.

In the case that the security-relevant portion already comprises such a certificate by a certifying body when it is received by the trustworthy instance, the step of checking by the trustworthy instance can consist of merely verifying the certificate. However, the trustworthy instance can alternatively or additionally also carry out checks of its own when the certificate is present.

The method according to the invention can be regarded as particularly secure when the certificate with which the security-relevant portion to be installed in the security element was certified is from the same instance which simultaneously represents the owner of the security element. In the case of a SIM/UICC mobile communication card this could be the issuer of the security element for example. Also the application provider could simultaneously be the owner of the security element and the check instance, in particular the owner of a "security domain" on a physical security module, wherein the "security domain" takes the role of a security element within the meaning of the present invention. As a rule, it is only this owner who makes possible an installation of the security-relevant portion on the security element by the trustworthy instance in the fashion described below.

As already mentioned, the step of installing the security-relevant portion in the security element by the trustworthy instance preferably takes place in cryptographically secured fashion. The cryptographic keys employed for this purpose are then exchanged between the owner of the security element and the trustworthy instance in a step prior to the installation. A corresponding set of keys is stored in the security element.

Not security-relevant portions of the application are usually installed in the terminal, independently of a security element. Such an installation preferably takes place before an installation of the security-relevant portion of the application in the security element.

The trustworthy instance is an instance that is arranged remotely (from the terminal). The security-relevant portion of the application is transmitted to the trustworthy instance via a network.

In the simplest case merely one security element is present in the terminal, in which the security-relevant portion of the application can be installed. In the case that several security elements, for example several "security domains" are suitable for an installation of the security-relevant portion of the application, the application can select one of them. Such a selection can be carried out by a not security-relevant portion of the application. Accordingly, the application ascertains also the trustworthy instance administrating the security element in question in dependence on the selected security element.

When a plurality of trustworthy instances are available for administrating a security element, for example the security element selected in the described fashion, the application can again select one of them and ascertain in this fashion which trustworthy instance is to install the security-relevant portion of the application in the security element. However, it can also be provided that a selected security element or a security element present as the only suitable security element, when a plurality of trustworthy instances is available for this security element, selects such an instance for administration in connection with this application, for example in dependence on the application.

After the security element in which the security-relevant portion is to be installed, as well as the trustworthy instance administrating this security element in the concrete case have been ascertained in the above-described fashion, this security element transmits the security-relevant portion of the application to the trustworthy instance. An installation to be carried out in a subsequent step has already been described.

As already mentioned, the term "security element" in connection with the present invention encompasses on the one hand physical security elements or modules that can be removably integrated in a portable terminal or that are permanently incorporated therein. On the other hand, a "security element" within the meaning of the invention can also be merely a logically secured area in a memory of such a physical security element or module. Therein a physical security module can comprise a plurality of such secured areas, i.e. of such logical "security elements". In connection with the present invention it is essential merely that the security element permits to securely install security-relevant portions of the application therein, i.e. in particular protected against unauthorized access, be it by reading out, execution or by manipulation of another type.

Known portable security data carriers, in particular SIM/UICC mobile communication cards, secure multimedia cards of the like fall under the class of security elements that can be removably integrated in a terminal. The class of the security elements which are permanently incorporated in a terminal comprises for example so-called embedded SIM/UICC mobile communication cards, TPMs, NFC modules and the like. Likewise, secure execution environments within a specific hardware architecture of the terminal, for example a "trusted execution environment" according to the "Global Platform" specification are to be understood as permanently incorporated. Logical security elements of the above-mentioned type are made available in particular by "security domains" according to the "Global Platform" specification.

As portable terminals according to the invention, mobile communication devices, smart phones, tablet computers, netbooks, notebooks, intelligent multimedia devices (smart TV, set-top box, . . . ) smart meters and the like are suitable in particular, which are adapted to accommodate a security element according to the invention or in which a security element according to the invention has already been permanently incorporated or implemented.

BRIEF DESCRIPTION OF THE DRAWINGS

The invention will hereinafter be described by way of example with reference to the attached drawings. The figures are described as follows.

DETAILED DESCRIPTION OF VARIOUS EMBODIMENTS

Figure 1:
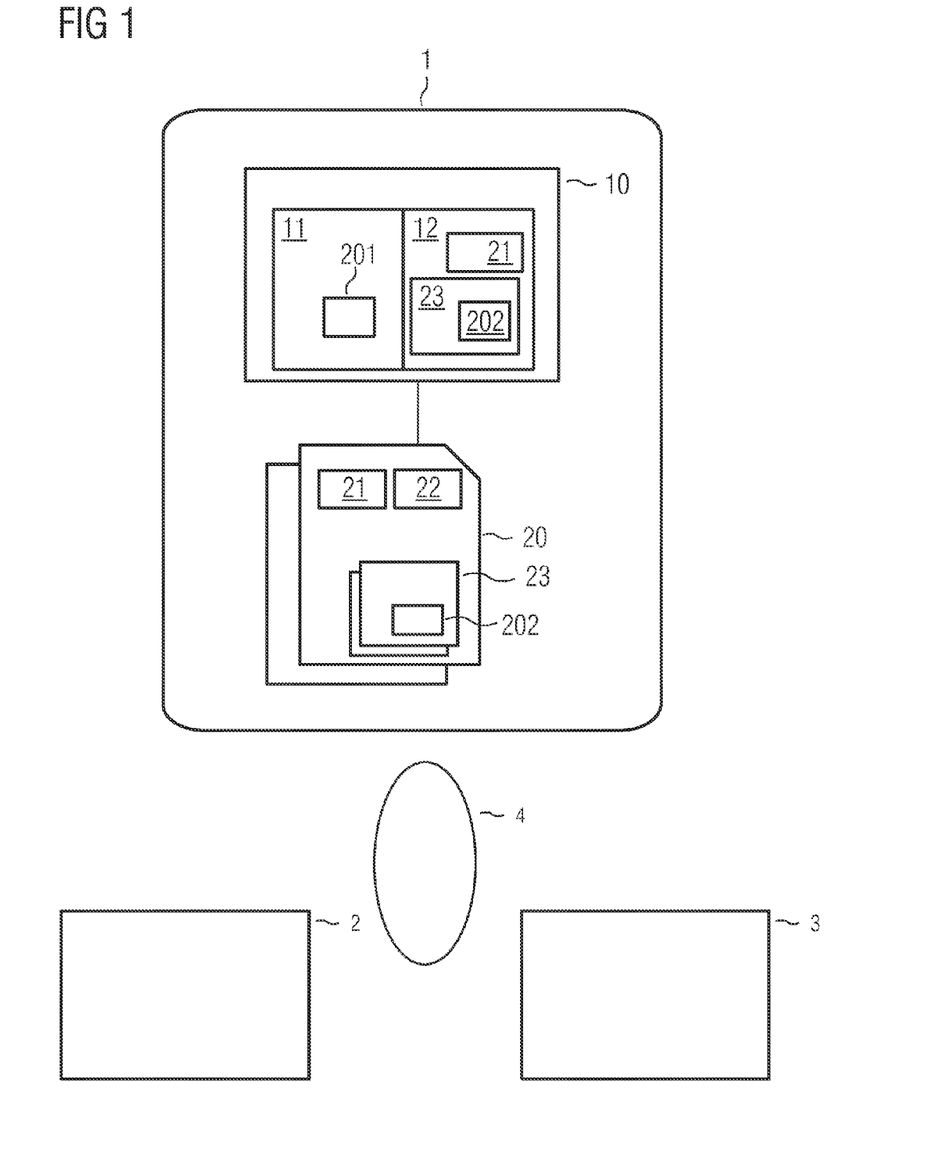
FIG. 1 a system comprising a terminal with a security element, an application provider and a TSM, FIG. 2 steps of a preferred embodiment of a method according to the invention.

FIG. 1 shows a system comprising a terminal 1, an application provider 2 and a TSM 3. The communication between the system components takes place via a network 4.

The application provider 2 offers different applications on the Internet for downloading to terminals. TSMs administrate security elements in terminals. The TSM 3 in the security element 20 administrates at least the one secure area 23 of the security element 20.

In the following, a terminal 1 is assumed to be present in the form of a smart phone, which is connected to the TSM 3 for example via a mobile communication network and to an application provider 2 for example via the Internet. As an alternative to the example, the terminal 1 can also be configured as a mobile communication device, as a tablet computer, as an ultrabook or netbook, as a notebook or the like.

The terminal 1 comprises a microprocessor 10 that is adapted to store and execute (reloadable) applications. For example, the not security-relevant portion 201 of an application downloaded from an application provider 2 is executed on the processor 10 of the terminal 1. The terminal 1 comprises an execution environment 11 for executing the not security-relevant portion 201. The application comprises the not security-relevant portion 201 and a security-relevant portion 202 that is to be installed on a security element 20.

The terminal 1 can comprise one or several security elements 20. To the microprocessor 10 a security element 20 is connected, which is indicated as a SIM card in the shown example. The security element 20 is removably integrated in the terminal 1. Alternatively or additionally, for example also a security element 20 could be present in the form of a secure memory card or the like. Alternatively or additionally to a removably integrated security element 20, the terminal 1 could also be equipped with a permanently incorporated security element 20, for example an embedded SIM/UICC mobile communication card, a TPM, an NFC module or the like. Finally, also a secure execution environment 12 within a specific hardware architecture of the terminal 1 could serve as security element 20, for example as a "trusted execution environment" according to the "Global Platform" specification. The secure execution environment 12 is executed besides the normal execution environment 11 on the processor 10 of the terminal 1.

A security element 20 can comprise one or several secure areas 23. Secure areas can be "security domains" according to the "Global Platform" specification as described above. To every security element a TSM is allocated that administrates this security element or at least a secure area of the security element. The secure areas 23 are fundamentally suitable for installing therein the security-relevant portion 202 of an application in the fashion described below with reference to FIG. 2.

However, the terminal 1 can comprise a plurality of security elements 20, 12. Every security element 20, 12 can additionally in turn comprise a plurality of secure areas 23. Different TSMs can be allocated to different security elements. Likewise, different TSMs can be allocated to different secure areas. In the security element 20, 12 therefore allocation information 21 is stored. The allocation information 21 specifies which TSM administrates the security element of the terminal,
the security elements of the terminal,
the secure areas of the security element of the terminal or
the secure areas of the security elements of the terminal.

The security element 20 finally comprises a control unit 22, for example in the form of a software module. The control unit 22 is adapted to establish a data communication connection with a trustworthy instance 3 that administrates the security element 20. Via this connection the security element 20 can then transmit a security-relevant portion 202 of an application 200 to the trustworthy instance 3 by means of the control unit 22, before said security-relevant portion is installed in the security element 20, as described below with reference to FIG. 2. The control unit 22 can additionally be adapted to select the security element and/or the secure area in which the security-relevant portion is to be installed. The control unit 22 employs the allocation information 21, but can also be adjusted to generate the allocation information 21 for all installation locations present in the terminal. The control unit 22 can be executed in the security module 20 or in the terminal.

Figure 2:
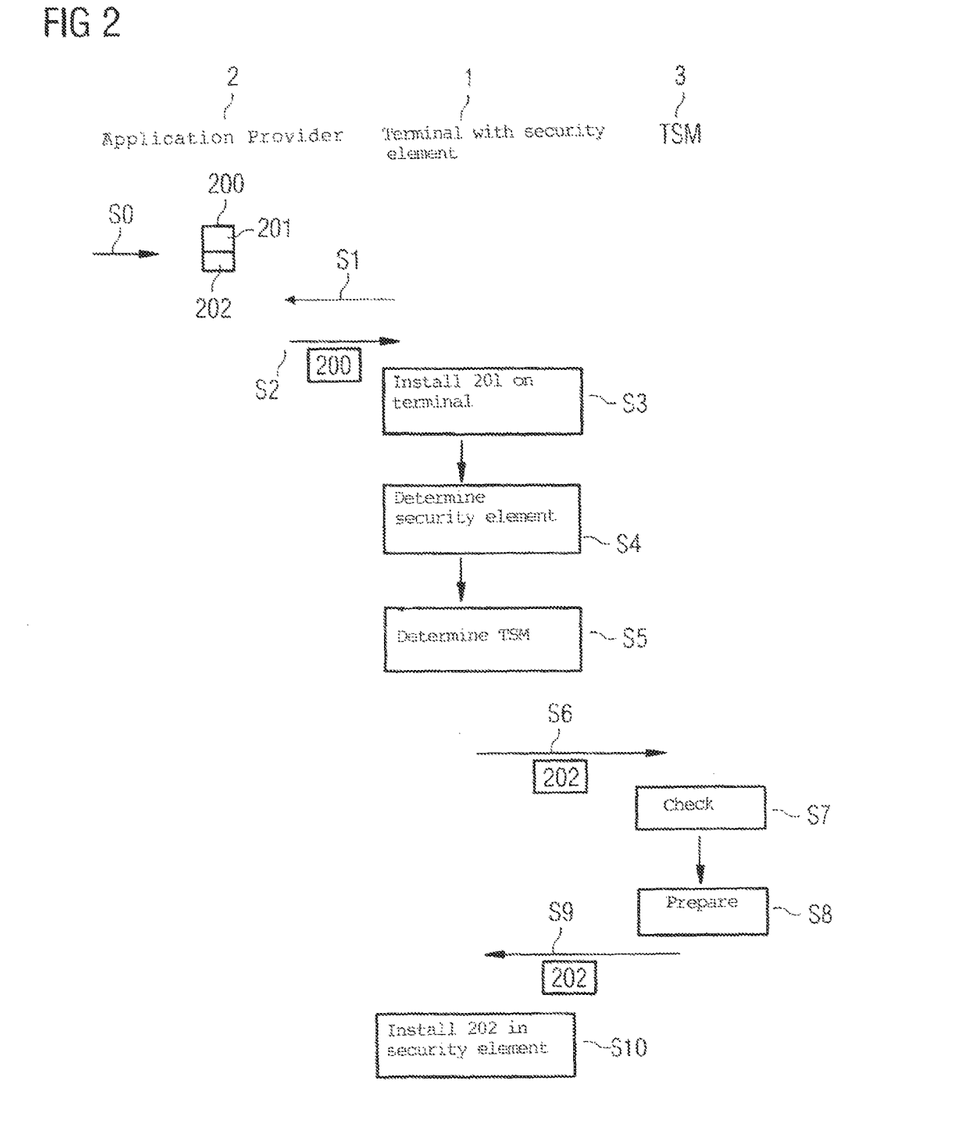

FIG. 2 shows steps of a method for installing a security-relevant portion 202 of an application 200 made available by an application provider 2 in a security element 20 of a terminal 1.

The application 200 is made available to the application provider 2 by any desired developer in step SO. This means that the application provider 2 merely makes available the infrastructure for making available applications 200 for downloading by interested users, whereas different developers producing corresponding applications 200 use the application provider 2 as a channel for distributing the applications 200 produced by them. Application providers 2 of this type are known as "app stores", corresponding applications 200 are known as so-called "apps".

As shown in FIG. 2, the application 200 comprises a security-relevant portion 202, as well as not security-relevant portions 201. As a rule, the developer will already store the application 200 at the application provider 2 in such a form that the parts 201 and 202 are clearly separated. The not security-relevant portion 201 of the application 200 can also be omitted completely, however. In this case, the application 200 consists only of a security-relevant portion 202.

As already mentioned, a security-relevant portion 202 of an application 200 here is understood as security-relevant data comprised or processed by the application 200, as well as (partial) functionalities of the application 200 serving for processing these data. Security-relevant data here can be for example personal data of a user of the terminal 1 to be kept secret, such as for example biometric data or data employed for making financial transactions, such as for example credit card number, account data, content of electronic purses, cryptographic keys, etc.

Preferably, the security-relevant portion 202 is checked at least before installation in the security element 20 (cf. step S9 below). With reference to executable or interpretable program code, which can form part of the security-relevant portion 202, various aspects can be checked. This concerns for example the compatibility of the security-relevant portion 202 with the security element 20, for example to a processor and/or an interpreter of the security element 10, an operating system of the security element 10 and the like. Also compliance with technical specifications can be an object of the check, for example whether commands employed in the code fulfill a given specification. Further, executable/interpretable code forming part of the security-relevant portion 202 can be checked in view of the functionality made available by this portion 202. In doing so, it is checked in particular whether the security-relevant portion 202 comprises malicious code. Other security aspects, for example the susceptibility of the security-relevant portion 202 to known attacks on the security element 20, for example by so-called side channel attacks, can be checked alternatively or additionally.

In particular such portions of the security-relevant portion 202 which do not represent executable or interpretable code can be checked within the framework of the check for integrity and/or authenticity of the data in question, for example with the aid of checksums, MACs or certificates, for example based on an asymmetrical key architecture.

Preferably, such a check takes place in a not shown, prior step. Before the developer makes available the application 200 to the application provider 2, the developer can present the security-relevant portion 202 to a check instance (not shown) that carries out the described check as a service provider, and, if the check is successful, marks the portion 202 as checked, for example by means of a corresponding certificate. Such a check instance can be an independent software certifying body, the issuer of the security element 10 or a similar instance for example. This certificate can then be checked in a simple fashion by every further body having to do with the security-relevant portion, for example the application provider 2, the terminal 1 or (cf. step S7) the TSM 3.

Alternatively or additionally also the application provider 2 can become active as check instance of the described type. In this case, the developer can make available the application 200 to the application provider 2 with a not yet certified security-relevant portion 202.

The check of the security-relevant portion 202 can be carried out or at least be verified alternatively or additionally by the TSM 3, as described below (cf. step S7).

Preferably, the terminal 1 requests the application 200 from the application provider 2, 51. In step S2 the terminal 1 receives the application 200 from the application provider 2, for example by downloading the application 200 via an Internet portal of the provider 2.

Subsequently, in a step S3, when at least one not security-relevant portion 201 is present, this not security-relevant portion 201 is installed in the terminal 1, i.e. in the microprocessor of the terminal 1. When installed, this portion 201 can optionally support the further steps S4 and S5 of the method.

In the case that in the terminal 1 a plurality of security elements 20 is present, which can be respectively suitable to accommodate the security-relevant portion 202 of the application 200 in installed form, one of these is determined, i.e. selected, for the further method in step S4. The determination of the security element 20 from a number of security elements can be carried out by the application 200, i.e. more exactly its portion 201, and/or by the control unit 22 of FIG. 1. The type of security-relevant portion 202 to be installed can influence the selection. For example the functionality made available by the portion 202 can relate to an owner (subscriber) of a corresponding security element 20 (SIM card). However, also a specific security element 20 can be present in the terminal 1 which is provided as the only one of the security elements 20 present in the terminal 1 to accommodate security-relevant portions 202 of a reloadable application 200, and is selected in step S4 for this reason. A terminal with a secure mass memory card, an NFC module and a SIM card notices for example that only the SIM card as a physical security element comprises a suitable crypto-coprocessor. For a SIM card having several execution environments or secure areas as security elements, for example the security element is selected that contains the payment function (credit card) required for the application 200.

In step S5 then a trustworthy instance 3 is determined, which is provided in the concrete case to administrate the security element 20 determined in step S4, i.e. to install the security-relevant portion 202 of the application 200 in the security element 20. In the present example the TSM 3 serves as trustworthy instance. Also the determination of the TSM can be supported by the portion 201 of the application 200 or by the control unit 22 (in the terminal 1 or in the security element 20, 12). As a rule, the "responsible" TSM 3 is already predetermined by the security element determined in step S4. However, it is possible that for a security element 20 a plurality of TSMs 3 are available or can be selected for administrating the security element 10. Preferably, the security element 20 itself stores a list 21 of TSMs. In particular—as already mentioned—a responsible TSM can be allocated to each secure area on the security element. To each secure area exactly one or several TSMs can be allocated in the list, which can be selected in step S5 as responsible TSM. The communication address of the responsible TSM is likewise stored on the security module or in the list 21.

The steps S4 and/or S5 and/or S6 can be carried out—as described above—by the portion 202 of the application 200 or by a dedicated unit 22, which is executed in an execution environment of the (physical) security element or the terminal. The dedicated unit 22 for determining the responsible TSM and for the corresponding forwarding simplifies the configuration of the application 200. In particular, a dedicated unit 22 can carry out the steps S4-S6 preferably on the security element (but also on the terminal), with the aid of allocation information 21 stored on the security element. The stored allocation information items 21 comprise—besides the allocation of the security element or secure area to the TSM—also the TSM communication addresses.

By means of the control unit 22 then a data communication connection is established in step S6 with the TSM 3 determined in step S5. This data communication connection can extend via data communication interfaces of the terminal 1, for example an antenna or the like. Via this data communication connection the security element 20 further sends the security-relevant portion 202 to the TSM 3 in step S6, the security-relevant portion having been made available for this purpose beforehand to the security element 20 by the terminal 1. The security element 20 has access to the corresponding contact data or interfaces of the TSM 3, which are stored for example in a memory of the security element 20 or can be queried by the security element 20 from an external server (not shown). The transmission of the portion 202 in step S6 can take place for example by SMS or via the Internet, e.g. via a web service.

In step S7 the TSM checks the security-relevant portion 202 received from the security element 20. The check can concern all above-described aspects and/or complementary aspects. However, in the case that the portion 202 already comprises a certificate of a check instance, by means of which a successful check of the portion 202 is confirmed, the check by the TSM in step S7 can be limited to verifying the certificate. As a rule, this takes place by verifying a signature generated by the check instance with its secret key by means of a public key of the check instance.

It is understood that the TSM 3 only carries out the further steps of the method if the check in step S7 has been successful.

In the optional step S8 the TSM 3 suitably prepares the portion 202, if required, for installation in the security element 20 following in step S9. Such a preparation step can for example convert the portion 202 into a predetermined format, carry out security adjustments to the portion 202 or the like. This preparation can be specific to the TSM 3, depend on the type of the portion 202 and/or on the security element 20 itself.

With the steps S9 and S10, the TSM 3 finally installs the possibly prepared, security-relevant portion 202 of the application 200 in the security element 20 integrated in the terminal 1. In step S9 the possibly prepared portion is transmitted back to the terminal and in step S10 the security-relevant portion 202 of the application 200 is installed on the security element 20 by means of the response of the TSM 3. Step S10 comprises in particular the loading of the portion into the security element and a possibly consecutive activation of the application.

In a variant the TSM 3 installs the portion 202 by controlling the steps S9 and S10. However, likewise, the step S10 can also be controlled by the control unit 22.

For the installation, the TSM 3 employs cryptographic keys negotiated with the owner of the security element 20 beforehand (in a not shown step), which keys are present likewise in the security element 20 in corresponding form. The process of a remote installation of applications on security elements by an instance such as the TSM 3 is known. Particularly the installation of applications in secure areas within the meaning of the Global Platform specification has been described sufficiently.

In particular, thus the security-relevant portion 202 of the application 200 forwarded by the terminal is transmitted back to the terminal via the network. The portion 202 transmitted back is installed on the security element 20.

It can be provided fundamentally for example that an external instance, in the present example e.g. the application provider 2, can rent memory space in a security element 20 of the terminal 1, in particular for installing therein the portion 202 of the application 200. It should then be possible for an invoicing of the costs for renting this memory space to take place in automated fashion. For this purpose the application 200, i.e. the not security-relevant portion 201 installed in the terminal 1 already in step S3, makes corresponding requests as to the renting of memory space to the owners of the security elements 10 present in the terminal 1.

When the possibility of renting is confirmed by the owner of such a security element 10, such a renting of memory space can take place on the security element 20 in question, for example via a corresponding, automated interface. Insofar, the selection of the security element 10 within the meaning of the above-described step S4 has taken place here in specific fashion. The invoicing of the costs for renting the memory space likewise takes place automatically.

In a further, complementary step, the TSM 3, which was determined in the fashion described above with reference to step S5 also according to this embodiment, is informed that the owner of the security element 10 in question approves of the installation of the portion 202 in the rented memory space of the security element 10.

The invention claimed is:

1. A method for installing a security-relevant portion of an application made available by an application provider in a security element of a terminal, comprising the following steps of:
receiving the application comprising the security-relevant portion from the application provider in the terminal;
analyzing the application to identify which types of functionality are provided by the application; and
installing the security-relevant portion of the application in the security element of the terminal;
wherein for installing the security-relevant portion of the application the following steps are executed:
determining a trustworthy instance administrating the security element, wherein the trustworthy instance is selected from a plurality of trustworthy instances administrating at least one secure area of the security element;
transmitting at least a part of the security-relevant portion of the application to a trustworthy instance administrating the security element;
receiving a response of the trustworthy instance for the security-relevant portion of the application;
selecting a secure area among a plurality of secure areas of the security element in which to install the security-relevant portion of the application, wherein the selection is based on which types of identified functionality are provided by the application and based on which types of functionality are provided by the secure areas of the security element; and
loading the security-relevant portion of the application into the security element by means of the response of the trustworthy instance,
wherein installing the security-relevant portion in the security element is carried out by the selected trustworthy instance in cryptographically secured fashion, wherein cryptographic keys employed for this purpose are exchanged in a step prior to the installation between the selected trustworthy instance and at least one of: an owner of the security element or an owner of a secure area on the security element.

2. The method according to claim 1, wherein only the received response of the trustworthy instance makes possible the loading.

3. The method according to claim 1, further comprising a step of identifying the security element to load the security-relevant portion of the application in from a plurality of security elements before the step of transmitting.

4. The method according to claim 1, wherein a step of determining a secure area, into which the security-relevant portion of the application is to be loaded, from a plurality of secure areas on the security element before the step of transmitting.

5. The method according claim 1, wherein the security-relevant portion of the application is transmitted to the trustworthy instance and is received again from the trustworthy instance in a prepared form.

6. The method according to claim 1, wherein a not security-relevant portion of the application is installed in the terminal.

7. The method according to claim 1, wherein the terminal requests the application from the application provider.

8. The method according to claim 1, wherein the trustworthy instance checks the security-relevant portion of the application, in particular in view of at least one of: compatibility with the security element, technical specifications to be complied with or security aspects.

9. The method according to claim 8, wherein the trustworthy instance checks the security-relevant portion of the application by means of a certificate of a certifying body with which the security-relevant portion has been supplied.

10. A terminal having a security element, wherein the terminal is adapted to carry out a method including:
receiving the an application comprising the a security-relevant portion from the application provider in the terminal;
analyzing the application to identify which types of functionality are provided by the application; and
installing the security-relevant portion of the application in the security element of the terminal;
wherein for installing the security-relevant portion of the application the following steps are executed:
determining a trustworthy instance administrating the security element, wherein the trustworthy instance is selected from a plurality of trustworthy instances administrating at least one secure area of the security element;
transmitting at least a part of the security-relevant portion of the application to a trustworthy instance administrating the security element;
receiving a response of the trustworthy instance for the security-relevant portion of the application;
selecting a secure area among a plurality of secure areas of the security element in which to install the security-relevant portion of the application, wherein the selection is based on which types of identified functionality are provided by the application and based on which types of functionality are provided by the secure areas of the security element; and
loading the security-relevant portion of the application into the security element by means of the response of the trustworthy instance, wherein installing the security-relevant portion in the security element is carried out by the selected trustworthy instance in cryptographically secured fashion, wherein cryptographic keys employed for this purpose are exchanged in a step prior to the installation between the selected trustworthy instance and at least one of: an owner of the security element or an owner of a secure area on the security element.

11. A hardware security element for a terminal, wherein, the hardware security element is integrated in the terminal, and the hardware security element is configured to:
receive the application comprising the security-relevant portion from the application provider in the terminal;
analyze the application to identify which types of functionality are provided by the application; and
install the security-relevant portion of the application in the security element of the terminal;
wherein for installing the security-relevant portion of the application the hardware security element is further adapted to:
determine a trustworthy instance administrating the security element, wherein the trustworthy instance is selected from a plurality of trustworthy instances administrating at least one secure area of the security element, and transmit a security-relevant portion of an application received by the terminal to a trustworthy instance administrating the hardware security element, and analyze the security-relevant portion of the application to identify which types of functionality are provided by the application, wherein the security-relevant portion is to be installed in a selected area among a plurality of secure areas of the hardware security element selected based on which types of identified functionality are provided by the application and based on which types of functionality are provided by the secure areas of the security element, and wherein installing the security-relevant portion in the security element is carried out by the selected trustworthy instance in cryptographically secured fashion, wherein cryptographic keys employed for this purpose are exchanged in a step prior to the installation between the selected trustworthy instance and at least one of: an owner of the security element or an owner of a secure area on the security element.

12. The hardware security element according to claim 11, wherein the hardware security element carries out a step of identifying a secure area into which the security-relevant portion of the application is to be loaded, from a plurality of secure areas on the secure element.

13. The hardware security element according to claim 11, wherein the hardware security element is configured as a hardware security element that can be removed from the terminal, in particular as a subscriber identity module (SIM)/universal integrated circuit card (UICC) mobile communication card, as a secure multimedia card, as a hardware security element that is permanently incorporated in the terminal, in particular as an embedded SIM/UICC mobile communication card, as a trusted platform module (TPM), as a near field communication (NFC) module or as a secure execution environment executed on the processor of the terminal besides a normal execution environment as a "trusted execution environment" according to the "Global Platform" specification.

14. A hardware processor, having instantiated thereon an external trustworthy instance, configured to:
receive from a terminal a second portion of an application that is to be installed on a hardware security element, wherein a first portion of the application is installed on the terminal, and the trustworthy instance is adapted to analyze the second portion of the application to identify which types of functionality are provided by the application and install the second portion of the application on a selected area of the hardware security element, wherein installing the second portion of the application includes determining a trustworthy instance administrating the security element, wherein the trustworthy instance is selected from a plurality of trustworthy instances administrating at least one secure area of the security element, transmitting at least a part of the security-relevant portion of the application to a trustworthy instance administrating the security element, selecting a secure area among a plurality of secure areas in the terminal selected based on which types of identified functionality are provided by the application and based on which types of functionality are provided by the secure areas of the security element, and loading the security-relevant portion of the application into the security element by means of a response of the trustworthy instance in response to receiving the second portion from the terminal, wherein installing the security-relevant portion in the security element is carried out by the selected trustworthy instance in cryptographically secured fashion, wherein cryptographic keys employed for this purpose are exchanged in a step prior to the installation between the selected trustworthy instance and at least one of: an owner of the security element or an owner of a secure area on the security element.

* * * * *